US011837805B2

(12) United States Patent
Veihl et al.

(10) Patent No.: US 11,837,805 B2
(45) Date of Patent: Dec. 5, 2023

(54) ELECTRICAL CONDUCTOR ASSEMBLY, METHOD FOR PRODUCING AN ELECTRICAL CONDUCTOR ASSEMBLY

(71) Applicant: TE Connectivity Germany GmbH, Bensheim (DE)

(72) Inventors: Maximilian Veihl, Bensheim (DE); Chris Buechling, Bensheim (DE); Manuel Eheim, Bensheim (DE); Frank Kaehny, Bensheim (DE); Marcus Wolf, Bensheim (DE); Harald Ulrich, Bensheim (DE); Kevin Scheer, Bensheim (DE); Florian Lueck, Bensheim (DE); Christoph Kosmalski, Bensheim (DE); Rolf Maurus, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/719,937

(22) Filed: Apr. 13, 2022

(65) Prior Publication Data
US 2022/0336974 A1 Oct. 20, 2022

(30) Foreign Application Priority Data
Apr. 14, 2021 (DE) .............................. 102021109369

(51) Int. Cl.
*H01R 11/11* (2006.01)
*H01R 43/28* (2006.01)
*H02G 15/02* (2006.01)

(52) U.S. Cl.
CPC ............. *H01R 11/11* (2013.01); *H01R 43/28* (2013.01); *H02G 15/02* (2013.01)

(58) Field of Classification Search
CPC .......... H01R 11/11; H01R 43/28; H02G 15/02
USPC ........................................................ 174/74 R
See application file for complete search history.

(56) References Cited

U.S. PATENT DOCUMENTS

| 5,541,380 | A  | * | 7/1996  | Ogden  | H01R 11/12 |
|---|---|---|---|---|---|
|   |   |   |   |   | 219/56.22 |
| 8,921,696 | B2 | * | 12/2014 | Otsuka | H01R 43/0207 |
|   |   |   |   |   | 174/94 R |
| 9,236,701 | B2 | * | 1/2016  | Nabeta | H01R 4/027 |
| 9,793,626 | B2 |   | 10/2017 | Koda   |   |

(Continued)

FOREIGN PATENT DOCUMENTS

| DE | 1765918 A1 | 11/1971 |
|---|---|---|
| DE | 102013004708 A1 | 9/2014 |

(Continued)

OTHER PUBLICATIONS

German Office Action, Application No. 102021109369.4—dated Dec. 10, 2021, 5 pages.

(Continued)

*Primary Examiner* — Timothy J Thompson
*Assistant Examiner* — Michael F McAllister
(74) *Attorney, Agent, or Firm* — Barley Snyder

(57) ABSTRACT

An electrical conductor assembly includes a line section having a plurality of conductor wires formed of a first electrically conductive material, a contact section in which the conductor wires are compacted to form a contact unit, and a layer formed of a second electrically conductive material. The layer is disposed on a contact surface of the contact unit.

20 Claims, 8 Drawing Sheets

(56) References Cited

U.S. PATENT DOCUMENTS

| | | | |
|---|---|---|---|
| 9,887,477 B1* | 2/2018 | Reed | H01R 43/16 |
| 10,381,752 B2 | 8/2019 | Kaehny et al. | |
| 10,404,024 B2* | 9/2019 | Higashitani | B23K 1/0004 |
| 10,998,645 B2* | 5/2021 | Scharkowski | H01R 43/02 |
| 2013/0233591 A1* | 9/2013 | Terasaka | H01B 13/0023 |
| | | | 174/117 R |
| 2015/0079456 A1 | 3/2015 | Pauleser | |
| 2016/0006146 A1* | 1/2016 | Schreck | H01R 11/28 |
| | | | 439/668 |
| 2016/0276758 A1* | 9/2016 | Warashina | H01R 11/12 |
| 2016/0294107 A1 | 10/2016 | Trimborn | |
| 2017/0338573 A1* | 11/2017 | Turner | H01R 11/11 |
| 2018/0358721 A1 | 12/2018 | Kioschis et al. | |
| 2018/0375227 A1 | 12/2018 | Kaehny et al. | |
| 2020/0091670 A1* | 3/2020 | Sato | H01R 43/0207 |
| 2021/0028562 A1* | 1/2021 | Nakamura | H01B 7/108 |

FOREIGN PATENT DOCUMENTS

| | | |
|---|---|---|
| DE | 102016203186 A1 | 9/2016 |
| DE | 102017208356 A1 | 11/2017 |
| DE | 202018100111 U1 | 9/2018 |
| DE | 102017116879 A1 | 12/2018 |
| DE | 102017210425 A1 | 12/2018 |
| FR | 1384073 A | 1/1965 |
| JP | S54157293 U | 12/1979 |
| JP | 2008041330 A | 2/2008 |
| JP | 2011023229 A | 2/2011 |
| JP | 2012209017 A | 10/2012 |
| JP | 2019009115 A | 1/2019 |
| WO | 2006057592 A1 | 6/2006 |
| WO | 2011007825 A1 | 1/2011 |

OTHER PUBLICATIONS

Extended European search report dated Sep. 6, 2022 corresponding to Application No. 22167936.8-1201, 10 pages.

Office Action from Japan's Patent Office dated Apr. 4, 2023, with English Translation thereof, corresponding to Application No. 2022-057856, 20 pages.

* cited by examiner

ELECTRICAL CONDUCTOR ASSEMBLY, METHOD FOR PRODUCING AN ELECTRICAL CONDUCTOR ASSEMBLY

CROSS-REFERENCE TO RELATED APPLICATIONS

This application claims the benefit of the filing date under 35 U.S.C. § 119(a)-(d) of German Patent Application No. 102021109369.4, filed on Apr. 14, 2021.

FIELD OF THE INVENTION

The invention relates to an electrical conductor assembly as well as to a method for producing an electrical conductor assembly.

BACKGROUND

An electrical conductor assembly is known that, for example, includes a line section with a plurality of conductor wires made of a first electrically conductive material and a contact section in which the conductor wires are compacted to form a contact unit. The contact unit can allow for simple connection to other elements. The compaction can be done, for example, by ultrasonic welding. The drawback of such conductor assemblies is that contacting the contact unit is often only associated with a high contact resistance.

SUMMARY

An electrical conductor assembly includes a line section having a plurality of conductor wires formed of a first electrically conductive material, a contact section in which the conductor wires are compacted to form a contact unit, and a layer formed of a second electrically conductive material. The layer is disposed on a contact surface of the contact unit.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
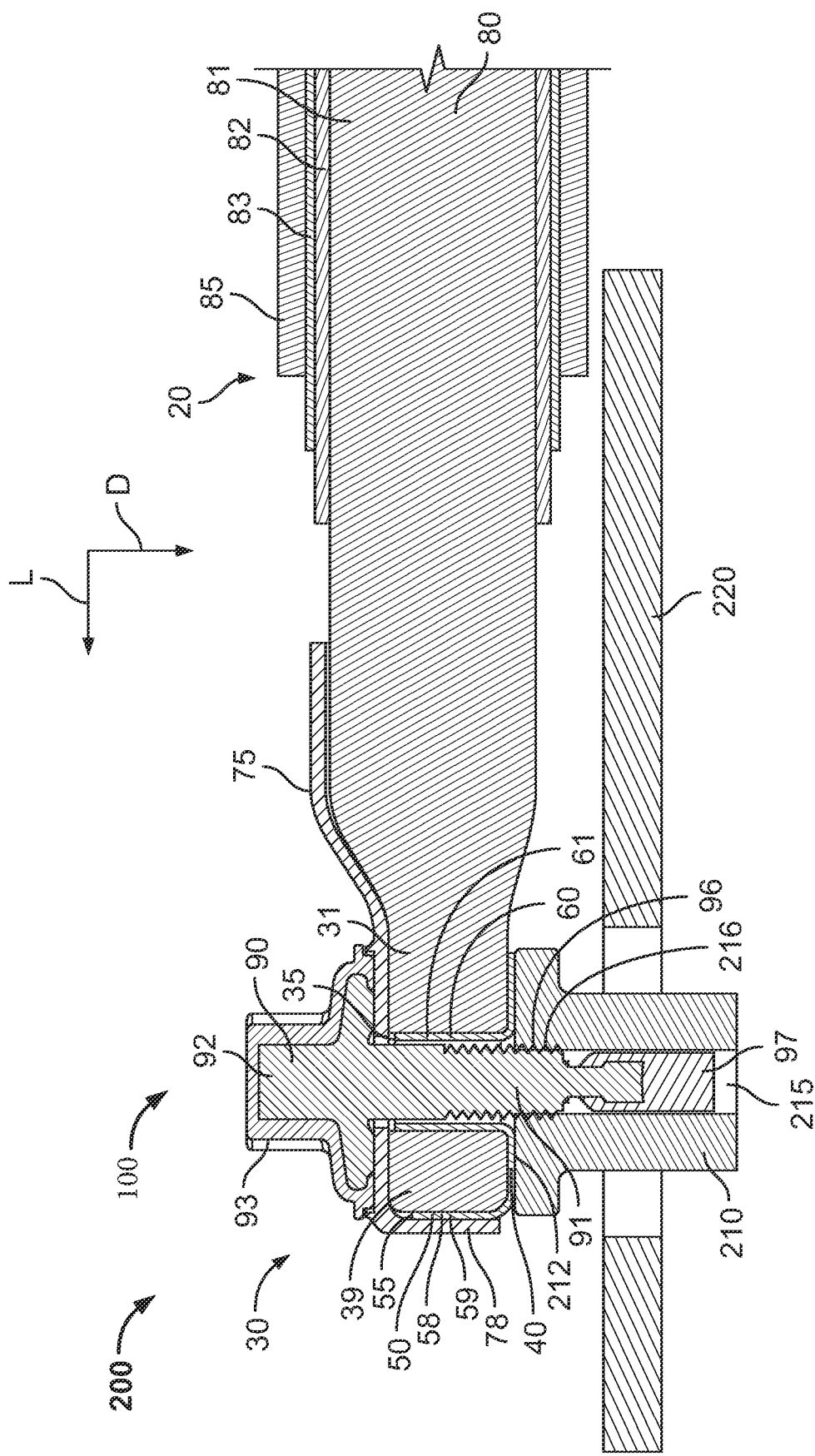
FIG. 1 is a sectional side view of a contact assembly with a conductor assembly according to an embodiment.

The invention shall be explained in more detail hereafter by way of example with reference to embodiments shown in the drawings. The developments and configurations shown there are each independent of one another and can be combined with one another depending on the application.

Figure 6:
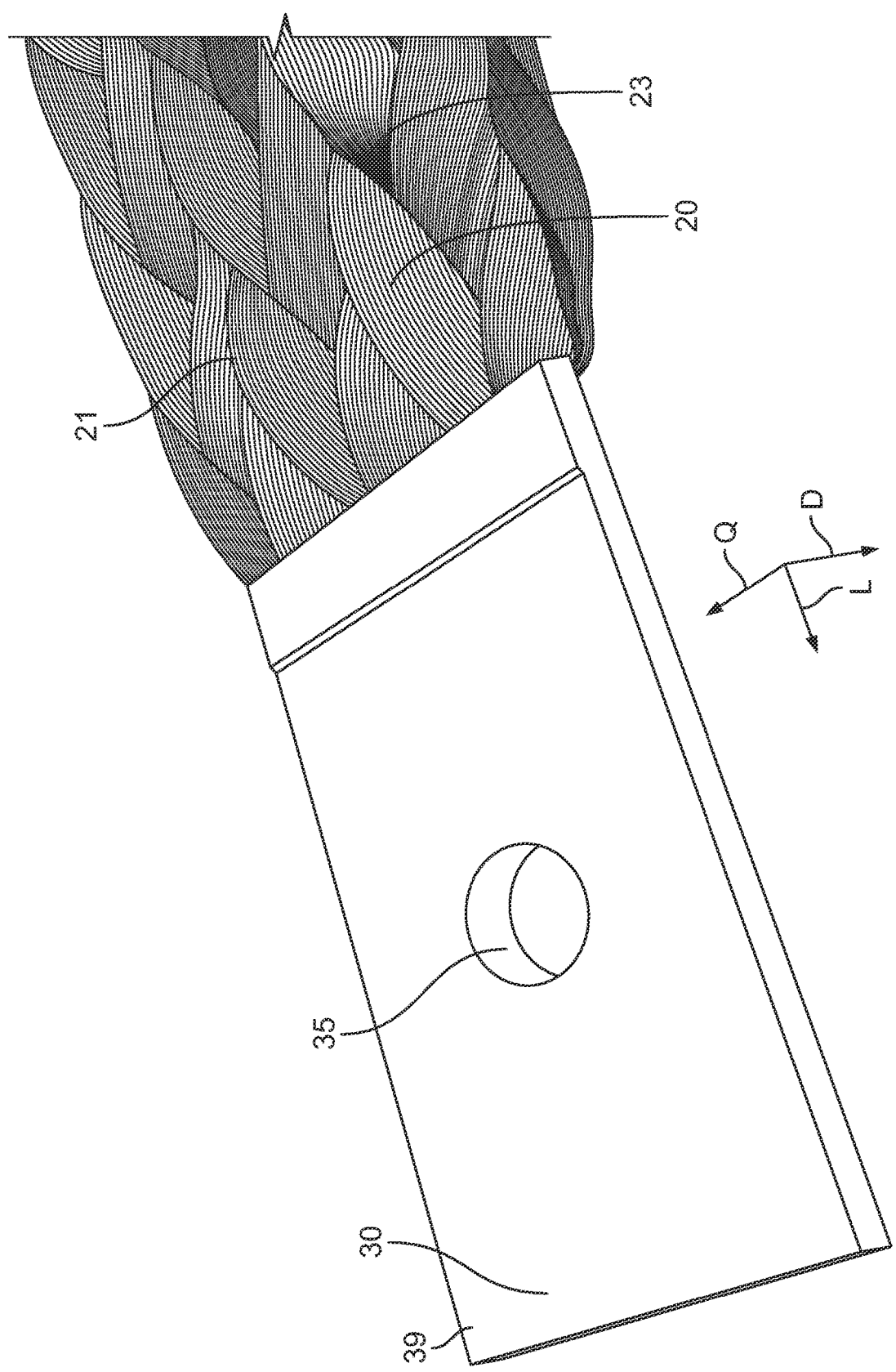
FIG. 6 is a perspective view of a contact section and a line section according to an embodiment.

Various configurations of an electrical conductor assembly 100 are shown in the figures. The electrical conductor assembly 100 comprises a respective line section 20 in which a plurality of conductor wires 21 made of a first electrically conductive material are present. Electrical conductor wires 21 can be, for example, combined to form different bundles 23 and bundles 23 can be braided together without being compacted in the line section 20, as shown in FIG. 6. This enables good stability having flexibility at the same time. For example, they can be braided together in a flat or tubular manner. In other configurations, electrical conductor wires 21 can also run parallel to one another, be braided together individually, be twisted together, or have any other arrangement. Copper, for example, or a material that contains copper, can be used as the first electrically conductive material.

In a contact section 30 of electrical conductor assembly 100, conductor wires 21 are compacted to form a contact unit 31, shown in FIG. 1. Electrical conductor wires 21 therefore form a compact member there, for example, in the form of a plate 39. Such a contact unit 31 can easily be connected to further elements, for example, to a mating contact element 210. For this purpose, a contact surface 32, for example, a mating contact surface 212, can be made to contact mating contact element 210. The configuration as the plate 39 can mean that the contact unit 31 is roughly cuboid, wherein the extension in one direction is significantly smaller than in two directions extending perpendicular thereto, for example, by a factor of 3.

Compacting is to be understood in particular to mean the creation of a connection in a positive substance-fit manner between the individual conductor wires 21. Empty spaces between the conductor wires 21 are reduced or almost at zero. The compacting can be effected in various ways, for example, by pressing and welding, in particular cold welding such as ultrasonic welding, or by melting. Conductor wires 21 can be made to assume a desired shape by simultaneous mechanical pressure. A compacted contact unit 31 can consist substantially of electrically conductive material and have few or no cavities.

Figure 3:
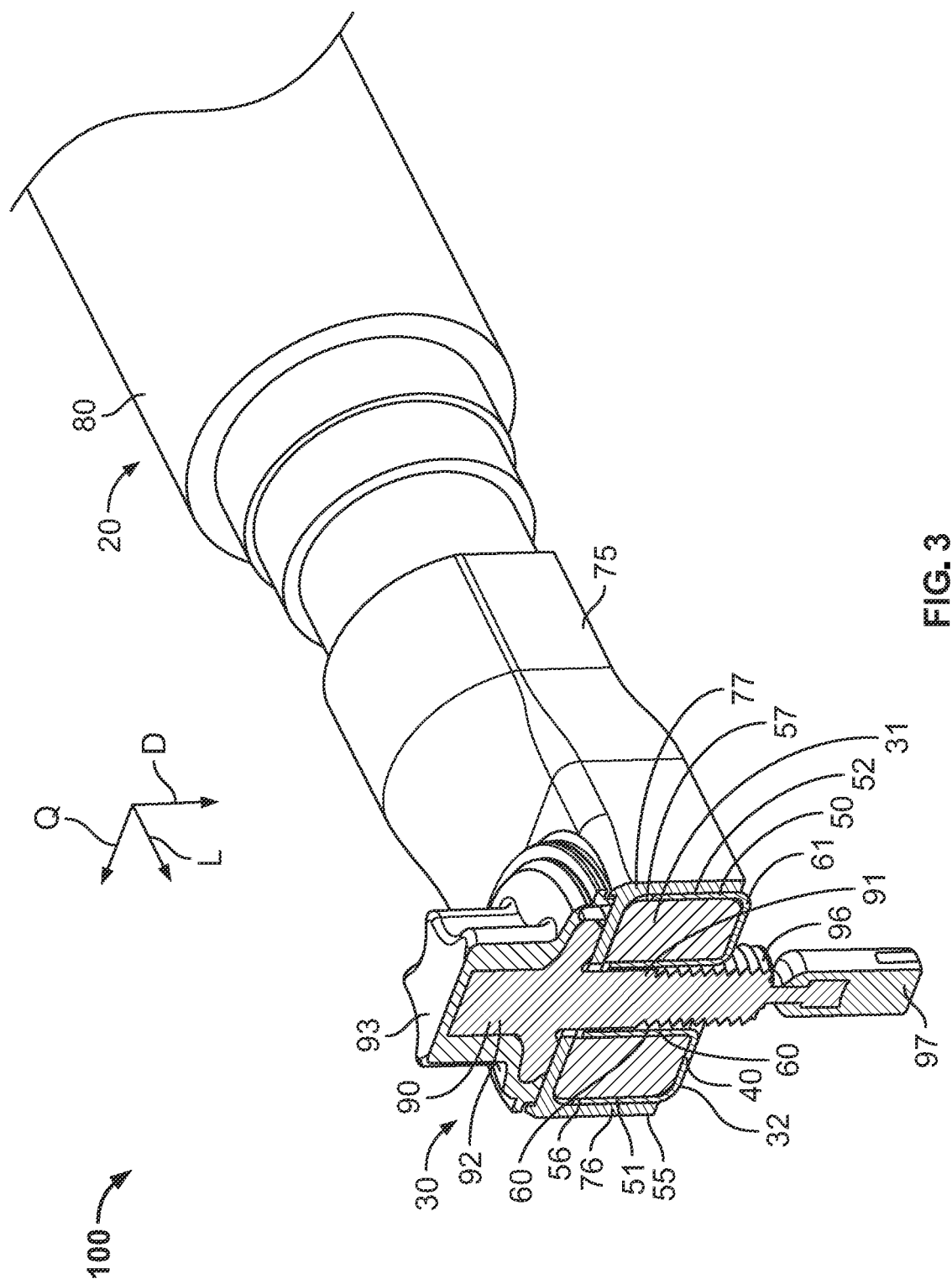
FIG. 3 is a sectional perspective view of the conductor assembly of FIG. 1.
Figure 4:
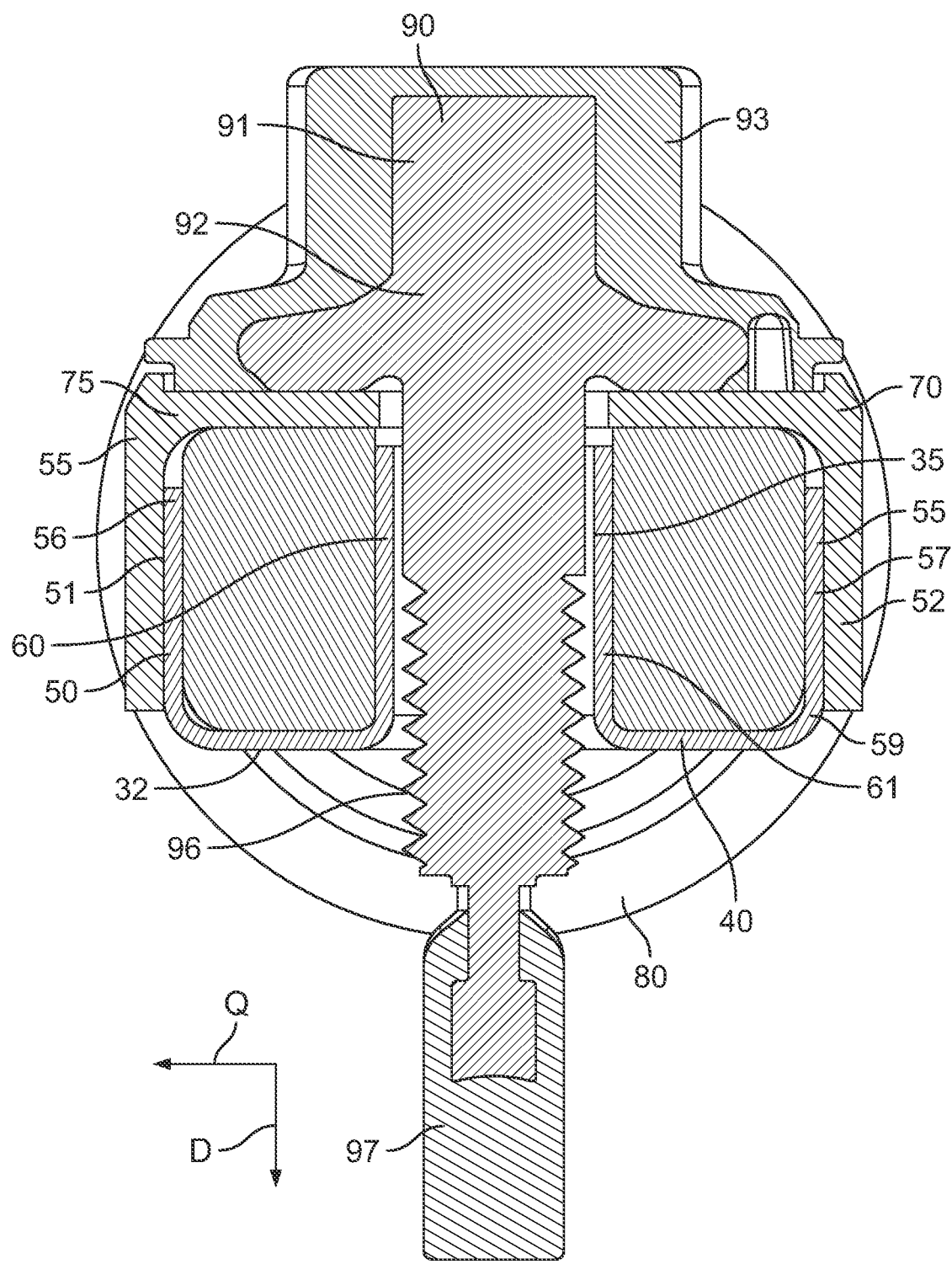
FIG. 4 is a sectional front view of the conductor assembly of FIG. 1.

A layer 40 made of a second electrically conductive material is provided on contact surface 32 in order to keep contact resistance as low as possible when contacting a mating contact element 210. Layer 40 can be formed integrally with the remainder of contact unit 31 and can be arranged, for example, as a separate element next to the plurality of conductor wires 21 prior to the compacting step and be attached in a positive substance-fit manner as layer 40 during the compacting step. The separate element can be a film, a plate, sheet metal, or an element formed from a film, a plate, or sheet metal. In the attached state, layer 40 can form contact surface 32, as shown in FIGS. 3 and 4. In other configurations, layer 40 is separate from contact unit 31. In an embodiment, the layer 40 can be welded to the contact unit 31.

Materials that can be used for layer 40 are, in particular, those which reduce contact resistance or prevent oxidation. They can be in particular tin, zinc, silver, gold or mixtures of these materials. Layer 40 can also contain copper.

Conductor assembly 100 can be part of a cable 80, as shown in FIG. 1. An inner conductor 81 of cable 80 can form line section 20 in part. Cable 80 can furthermore comprise an insulation layer 82 over inner conductor 81, an outer conductor 83 arranged thereover, and an outer cable sheath 85. Outer conductor 83 can serve as grounding or shielding.

Contact unit 31 has a through hole 35 which extends along a direction of passage D through contact unit 31, as shown in FIGS. 1 and 6, and in particular through contact surface 32. Direction of passage D is there perpendicular to a longitudinal direction L along which conductor wires 21 run in line section 20. Furthermore, both direction of passage D as well as longitudinal direction L are perpendicular to a transverse direction Q. Conductor wires 21 are therefore not discontinued by through hole 35 but run around it.

This can be achieved during production by inserting a respective tool between conductor wires 21 before or during the compacting step, which tool is removed again after compacting. Such a tool can have, for example, a tapering tip in order to facilitate the insertion through the plurality of electrical conductor wires 21. In the section in which the tool is disposed between electrical conductor wires 21 in the compacting step, it can have a cylindrical, for example, a circular-cylindrical, cross section. In another embodiment, the through hole 35 can be created after the compacting step, for example, by drilling or by another method in which material is removed.

As a result, a cylindrical through hole 35 can be produced, which enables the attachment in various rotational positions. In order to also be able to attach electrical conductor assembly 100 in certain defined orientations, through hole 35 and the corresponding tool can have a different cross section, for example, a rectangular, square, or triangular cross section.

Electrical conductor assembly 100 can comprise a stabilization sleeve 50, shown in FIG. 1, which stabilizes contact unit 31. Stabilization sleeve 50 can enclose contact unit 31 at least in part and thereby form a counter-bearing that reduces or prevents outward deformation, for example, during compacting, during the attachment, or when contacting. Stabilization sleeve 50 in particular can enclose or engage around contact unit 31 at least on two oppositely disposed sides 51, 52. The stabilization sleeve 50 can be connected at least in part in a positive substance-fit manner to the contact unit 31. In other configurations, the stabilization sleeve 50 is separate and can be detached from the contact unit 31.

In the examples shown, two sides 51, 52 are arranged with respect to transverse direction Q at different ends of contact unit 31, as shown in FIG. 3. This can prevent the contact unit 31 from expanding on the oppositely disposed sides 51, 52, for example, in the event of a mechanical load, as can occur when compacting, attaching, or contacting. Measured in the direction of passage D, stabilization sleeve 50 extends along almost the entire height of contact unit 31. Stabilization sleeve 50 can also enclose contact unit 31 at other sides, for example, at a front side. A front wall 58, shown in FIG. 1, can have an additional reinforcing effect if it connects side walls 56, 57, shown in FIG. 3, to one another arranged on sides 51 and 52.

Stabilization sleeve 50 can form a receptacle for contact section 31 and can be configured, for example, in the shape of a channel, trough, or trench. In an embodiment, layer 40 is a part of stabilization sleeve 50. It forms a base which is arranged at contact surface 32 or forms it. Stabilization sleeve 50 can be made from sheet metal 59, for example, by punching and bending. Such a component can be attached to electrical conductor wires 21 even before the compacting step and can also be used for stabilization already during the compacting.

Electrical conductor assembly 100 can furthermore comprise a guide member 60 which is used to guide an attachment element 90, as shown in FIG. 1. Guide member 60 can provide a smooth surface for attachment element 90 in order to enable easy insertion. Furthermore, a gap between the attachment element 90 and the contact unit 31 can be bridged by the guide member 60 so that a flow of force between the two is possible.

In the examples shown, guide member 60 is configured as a sleeve 61. Sleeve 61 is arranged in through hole 35. Furthermore, sleeve 61 is formed integrally with layer 40 and with stabilization sleeve 50. In this example, sleeve 61 is configured to be cylindrical, wherein the cylinder axis runs parallel to direction of passage D. Sleeve 61 together with stabilization sleeve 50 can also provide further stabilization for contact section 30. Contact unit 31 can be in particular held and stabilized between sleeve 61, the front wall 58, and side walls 56, 57.

Figure 2:
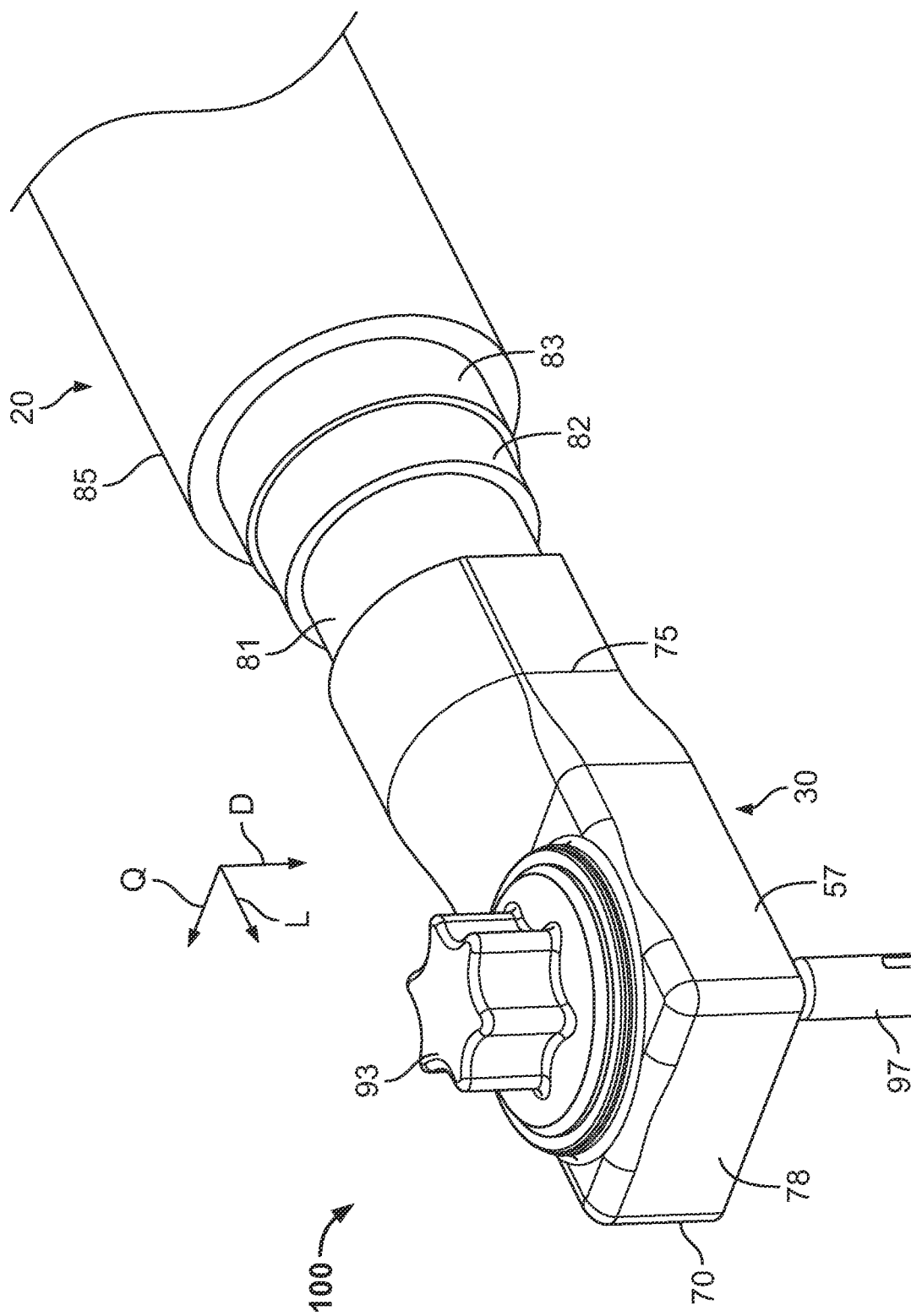
FIG. 2 is a perspective view of the conductor assembly of FIG. 1.

In order to prevent a user from inadvertently touching electrically conductive parts, conductor assembly 100 can comprise a touch guard 70, as shown in FIG. 2, which encloses contact section 30 at least in part. It is made of an electrically insulating material, for example, plastic material. In line section 20, electrical insulation is provided by cable sheath 85 which typically extends as far as touch guard 70, to which it then connects without any gaps. This prevents a user from touching.

Touch guard 70 can be part of a touch guard assembly 75 shown in FIG. 2 which, in addition to touch guard 70, also comprises touch guard caps 93, 97 on a screw 91, shown in FIG. 3, which serves as an attachment element 90. Touch guard caps 93, 97 are attached to a screw head 92 or to one end of screw 91 and enclose screws 91 there.

Figure 5:
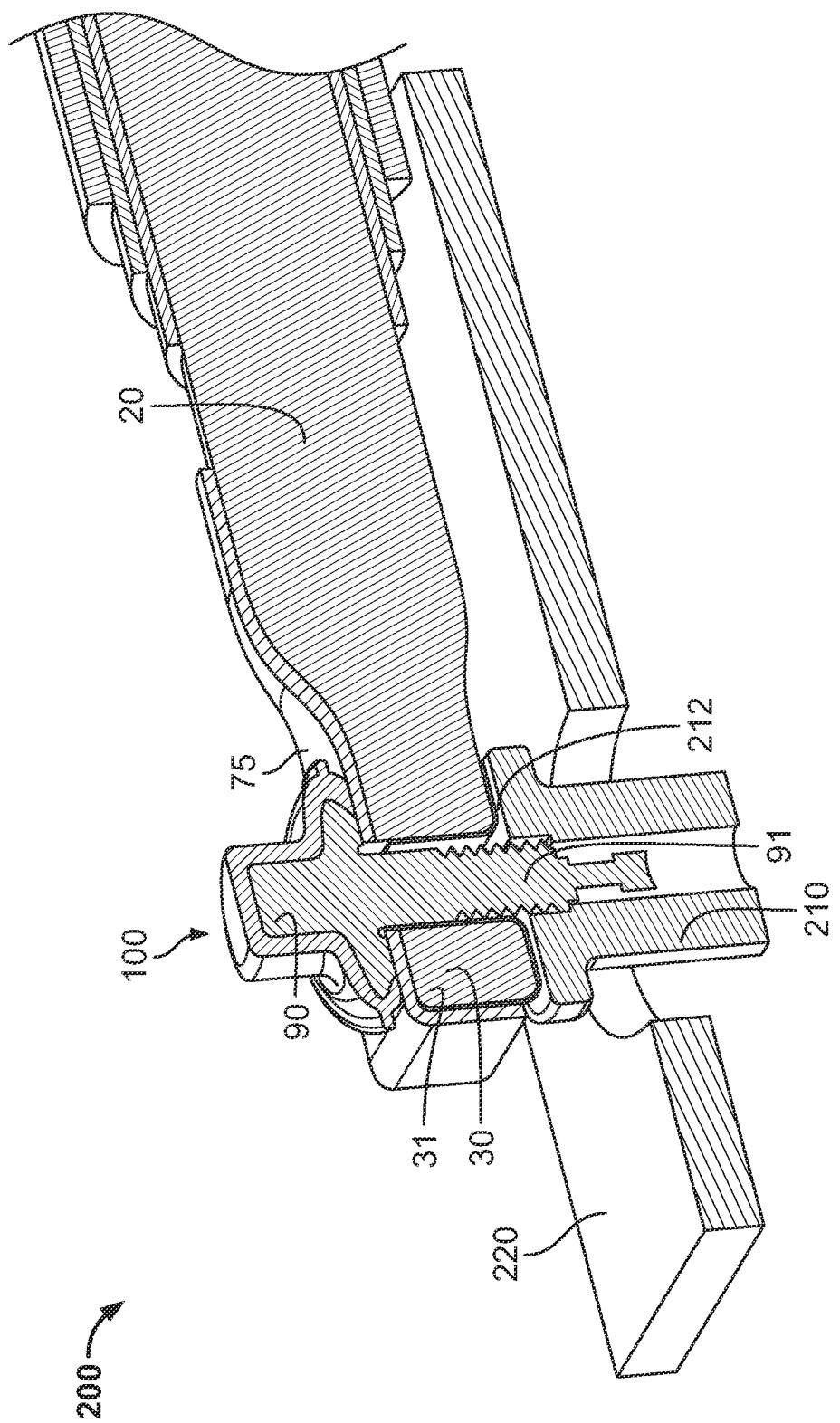
FIG. 5 is a sectional perspective view of the contact assembly with the conductor assembly of FIG. 1.

When electrical conductor assembly 100 is connected to a corresponding mating contact element 210, touch guard arrangement 75 then forms all-round protection against unwanted touching by a user, as shown in FIG. 5. In a non-connected state, only contact surface 32 is exposed, as shown in FIG. 4, and enables electrical contact with mating contact element 210.

Screw 91 is detachable repeatedly. An external thread 96 of screw 91 interacts with an internal thread 216 arranged in a through hole 215 of mating contact element 210, as shown in FIG. 1. The attachment element 90 can exert a force along the direction of the through hole 35. For example, the head 92 of the screw 91 can exert a force upon the contact unit 31 and press it against the mating contact element 210. The forces exerted by an attachment element 90 can thereby act directly upon the contact surface 32. The electrical contact can thereby be improved particularly effectively. Mating contact element 210 can be connected in an electrically conductive manner to a busbar 220 or it can be part of a busbar 220

Touch guard 70 encloses part of stabilization sleeve 50 and thereby forms part of a stabilization assembly 55 which further stabilizes contact unit 31, as shown in FIGS. 3 and 4. Side walls 76, 77 of touch guard 70 there abut against side walls 56, 57 of stabilization sleeve 50 and support them towards the outside. Unlike stabilization sleeve 50, side walls 56, 57 of which are connected at an underside, side walls 76, 77 of touch guard 70 are connected at an upper side. Stabilization assembly 55, which comprises touch guard 70 and stabilization sleeve 50, consequently encloses contact unit 31 on all sides, in particular along a circumference, and thereby achieves a high level of stability.

FIG. 6 shows a contact unit 31 after compacting. Contact unit 31 forms a cuboid plate 39, the dimensions of which in direction of passage D are significantly smaller than in longitudinal direction L and in transverse direction Q, in the example shown by at least a factor of 10. Other shapes and factors are of course also possible.

In FIGS. 7A to 7D, various configurations are shown in which certain elements are present or not present. For example, in the embodiment according to FIG. 7A, there is a touch guard 70 present which is not present in the other configurations.

Figure 7:
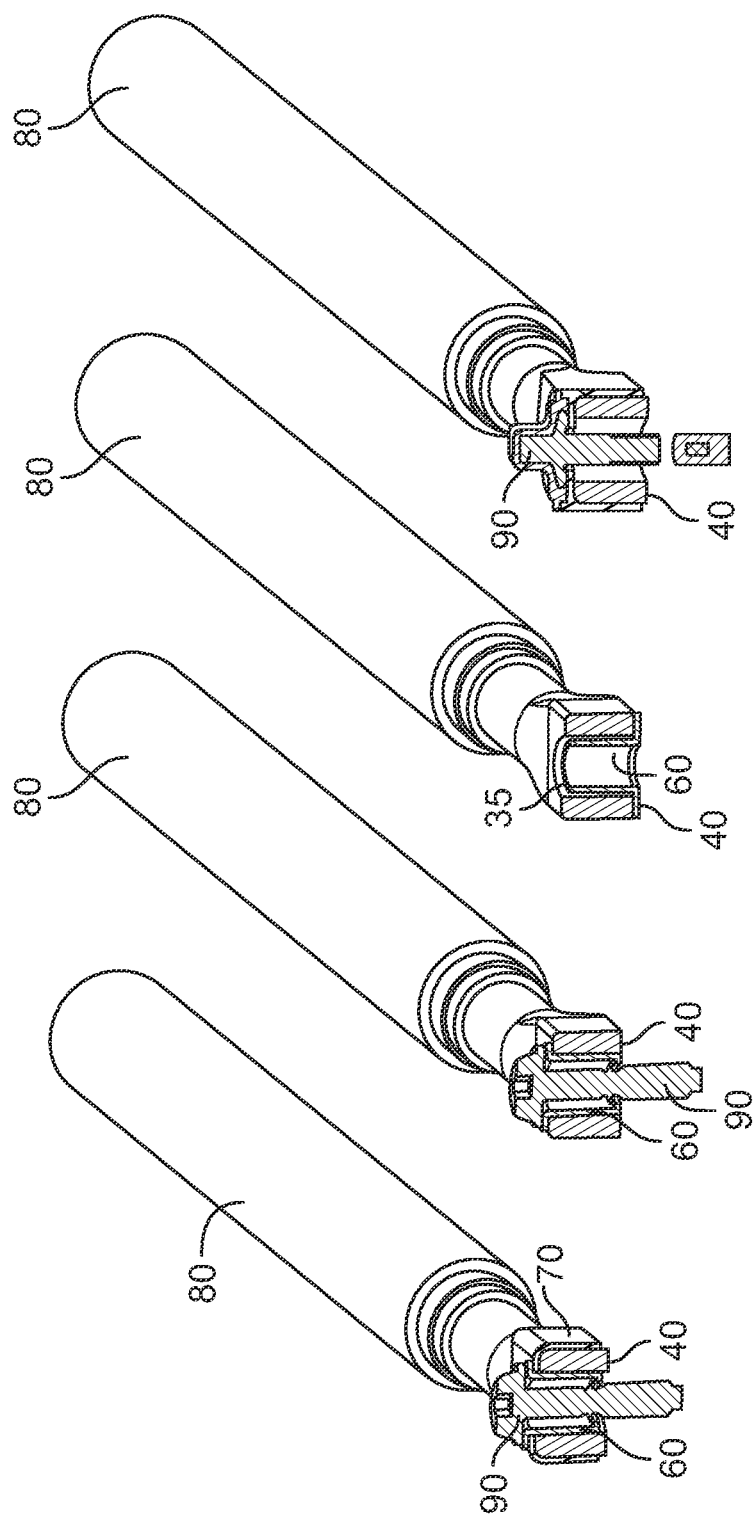
FIG. 7A is a sectional perspective view of a conductor assembly according to another embodiment.
FIG. 7B is a sectional perspective view of a conductor assembly according to another embodiment.
FIG. 7C is a sectional perspective view of a conductor assembly according to another embodiment.
FIG. 7D is a sectional perspective view of a conductor assembly according to another embodiment.

The configurations according to FIGS. 7A to 7C each comprise a guide member 60 in the form of a sleeve 61 in through hole 35, similarly to that shown in FIG. 4, whereas it is not present in the configuration according to FIG. 7D.

In the configuration according to FIG. 7C, there is no attachment element 90 present, whereas in the embodiments according to FIGS. 7A, 7B and 7D it is present in the form of a screw. Such an attachment element 90 can also be present on a mating contact element 210, or attachment can be effected in a different manner.

Configurations without a layer 40 are also possible. Other aspects, such as, for example, stabilization sleeve 50, touch guard 70, or guide member 60 can represent independent inventions.

Figure 8:
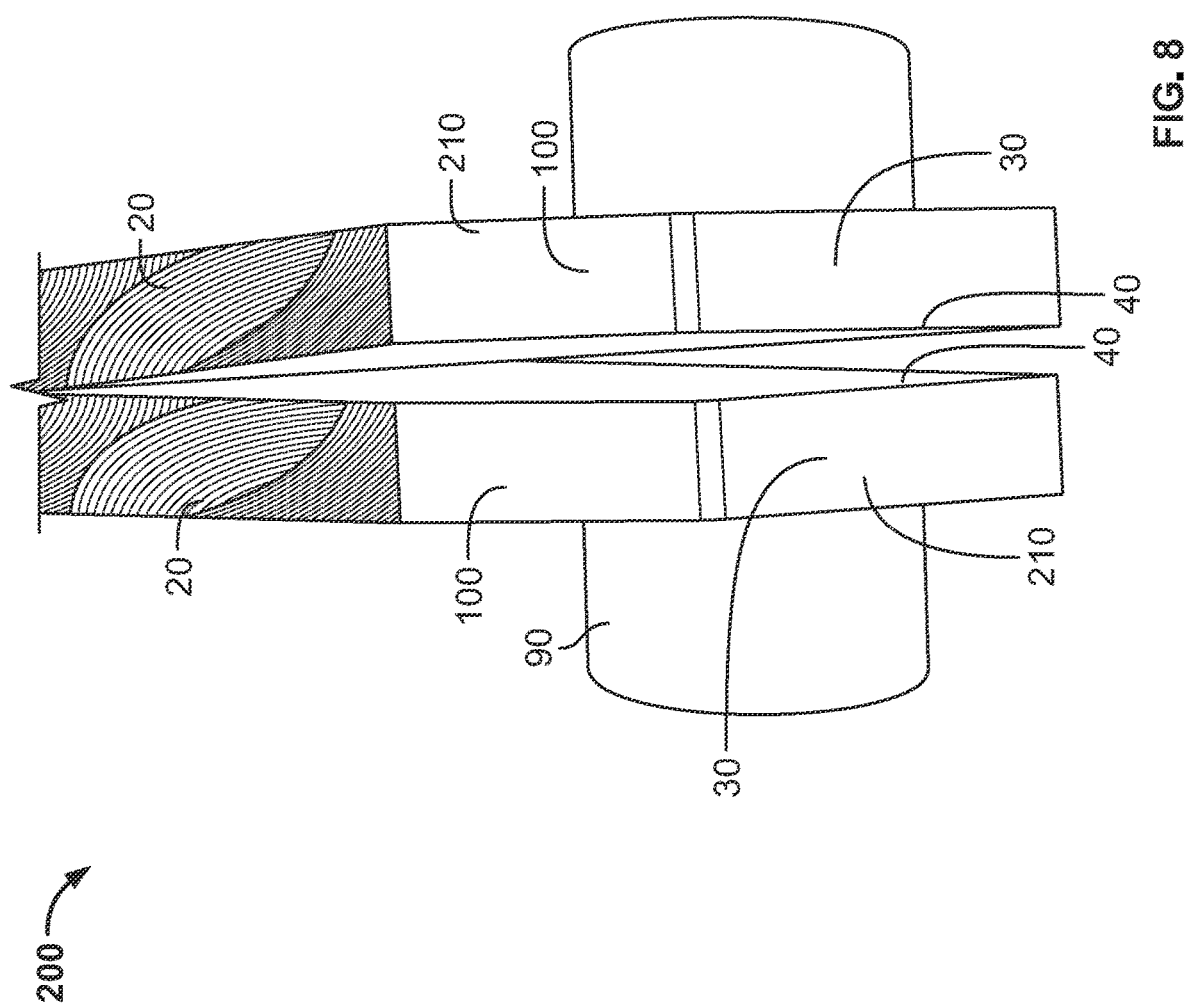
FIG. 8 is a perspective view of a contact assembly according to another embodiment.

FIG. 8 shows a configuration in which two conductor assemblies 100 form a contact assembly 200. Each of conductor assemblies 100 can be viewed as a mating contact element 210 for other conductor assembly 100. At least one of conductor assemblies 100 comprises a layer 40 which reduces contact resistance. Two conductor assemblies 100 can be attached to one another by way of an attachment element 90, for example, in the form of a screw 91 with a nut 94.

What is claimed is:

1. An electrical conductor assembly, comprising:
a line section having a plurality of conductor wires formed of a first electrically conductive material;
a contact section in which the conductor wires are compacted to form a contact unit;
a layer formed of a second electrically conductive material and disposed on a contact surface of the contact unit; and
a guide member for an attachment element.

2. The electrical conductor assembly of claim 1, wherein the layer is integrally connected to a remainder of the contact unit.

3. The electrical conductor assembly of claim 1, wherein the contact unit has a through hole.

4. The electrical conductor assembly of claim 3, wherein the conductor wires extend around the through hole in a continuous manner.

5. The electrical conductor assembly of claim 1, wherein the layer is part of a stabilization sleeve enclosing the contact unit at least in part.

6. The electrical conductor assembly of claim 1, wherein the guide member is formed integrally with a stabilization sleeve enclosing the contact unit at least in part.

7. The electrical conductor assembly of claim 1, wherein the guide member is arranged in a through hole of the contact unit.

8. The electrical conductor assembly of claim 1, further comprising a touch guard made of an electrically insulating material.

9. The electrical conductor assembly of claim 8, wherein the touch guard encloses the contact section at least in part.

10. The electrical conductor assembly of claim 8, wherein the touch guard encloses a stabilization sleeve at least in part, the stabilization sleeve enclosing the contact unit at least in part.

11. An electrical contact assembly, comprising:
an electrical conductor assembly including a line section having a plurality of conductor wires formed of a first electrically conductive material, a contact section in which the conductor wires are compacted to form a contact unit, a layer formed of a second electrically conductive material and disposed on a contact surface of the contact unit, and a guide member for an attachment element; and
a mating contact element, the layer abuts against a mating contact surface of the mating contact element.

12. The electrical contact assembly of claim 11, wherein the electrical conductor assembly is attached to the mating contact element by the attachment element that is repeatedly detachable.

13. A method, comprising:
compacting a plurality of conductor wires made of a first conductive material to form a contact unit;
attaching or applying a layer made of a second conductive material to a contact surface of the contact unit; and
arranging a separate element next to the plurality of conductor wires prior to the compacting step.

14. The method of claim 13, wherein the separate element is attached at least in sections as the layer during the compacting step.

15. The method of claim 13, wherein a through hole between the conductor wires is kept free in the compacting step.

16. An electrical conductor assembly, comprising:
a line section having a plurality of conductor wires formed of a first electrically conductive material;
a contact section in which the conductor wires are compacted to form a contact unit; and
a layer formed of a second electrically conductive material and disposed on a contact surface of the contact unit, the layer is integrally connected to a remainder of the contact unit.

17. An electrical conductor assembly, comprising:
a line section having a plurality of conductor wires formed of a first electrically conductive material;
a contact section in which the conductor wires are compacted to form a contact unit; and
a layer formed of a second electrically conductive material and disposed on a contact surface of the contact unit, the layer is part of a stabilization sleeve enclosing the contact unit at least in part.

18. An electrical conductor assembly, comprising:
a line section having a plurality of conductor wires formed of a first electrically conductive material;
a contact section in which the conductor wires are compacted to form a contact unit;
a layer formed of a second electrically conductive material and disposed on a contact surface of the contact unit; and
a touch guard made of an electrically insulating material.

19. The electrical conductor assembly of claim 18, wherein the touch guard encloses the contact section at least in part.

20. The electrical conductor assembly of claim 18, wherein the touch guard encloses a stabilization sleeve at least in part, the stabilization sleeve enclosing the contact unit at least in part.

\* \* \* \* \*